Nov. 12, 1968

H. R. FIENHOLD 3,410,537

GRAIN STIRRING APPARATUS

Filed May 17, 1967

Inventor
Harry Richard Fienhold
By Dawson, Tilton,
Fallon, Lungmus & Alexander
Attys.

United States Patent Office 3,410,537
Patented Nov. 12, 1968

3,410,537
GRAIN STIRRING APPARATUS
Harry Richard Fienhold, R.R. 1, Pontiac, Ill. 61764
Filed May 17, 1967, Ser. No. 639,108
7 Claims. (Cl. 259—111)

ABSTRACT OF THE DISCLOSURE

An improved control system for a grain stirrer having a rotating vertical auger orbiting about a storage bin containing grain includes a level-sensing device for changing states when the auger has reached a predetermined tilt or drag. The device has an inherent delay so that prior to stopping the orbiting motion of the auger, the tilt must have been sensed for a predetermined time.

---

An improved mechanism for sensing tilt or drag of an auger orbiting in a grain stirrer and for inhibiting its orbiting until the auger assumes its vertical position. A switch mechanism is mounted on the auger trolley for sensing drag. The mechanism includes an elongated tubular member carrying a plurality of freely-moveable ball bearings. The tube is pivotally mounted at its center and extends tangential to the orbiting direction of the auger. When the auger is vertical, the tube is normally biased in one position with an associated switch closed to supply energy to a motor pulling the auger in its orbit. When the auger tilts a predetermined amount, the tube is rotated forward and its bias changes so that the bearings roll forward and hold the tube in a second position in which an extension arm opens the switch to de-energize the motor until the auger straightens itself out, and the tube assumes its normal position. The forward and backward roll of the bearings define time delays between sensing a change in auger tilt and generating the signal to the motor. This time delay renders the mechanism insensitive to jolts which cause erroneous signals.

Background

The present invention relates to grain stirring apparatus; more particularly, it relates to a mechanism for sensing drag or tilt of a rotating auger orbiting in a grain stirrer.

Grain stirrers are well known, and they usually include a rotating auger which is suspended above the grain and extends down into the grain in a generally vertical disposition. When the auger is rotated, its spirally-shaped blade stirs the grain. Means are also provided for moving the auger in a varying spiral orbit about the grain bin to stir completely all of the contents of the bin.

Apparatus of this kind has been described in detail in the Murphy U.S. Patent No. 3,251,582, issued May 17, 1966. As disclosed therein, in practice the auger may be tilted from the vertical in either a radial direction (i.e. radial of the center of the bin); or it may be tilted in a direction tangential to the trajectory of the orbiting auger. In the latter case, which is herein sometimes referred to as drag, the lower, free end of the auger drags behind its orbiting apparatus, that is, the upper end is tilted forward.

When the auger drags, it may be uprighted if its spiral or orbiting motion is discontinued while its rotary motion is continued. Hence, prior devices have disclosed the use of level-sensing switches, such as mercury switches or pendulum switches which shut off the auger orbiting motor whenever the auger is tilted beyond a predetermined drag. I have found that these level-sensing switches are inadequate from the standpoint of continued reliable operation of the stirrer, as will presently be made clear.

Summary

The present invention provides an improved level-sensing switching mechanism for de-energizing the motor which pulls the auger in its orbit when the auger is tilted beyond a predetermined drag limit.

When the drag of the auger becomes excessive, a tubular member which extends tangential to its orbit is tilted forward so that it can no longer remain in its previous position (i.e. its only stable position when the auger is vertical). However, before the tube can assume another stable position, ball bearings inserted in the tube must roll past the center of the tube. This roll defines a built-in time delay between the fact of sensing that the auger has been displaced from the vertical and de-energizing its associated pulling motor. In this manner, the stirring mechanism can receive jolts or shocks during operation without instantaneous trigger of the auger-pulling motor. This prevents spurious or erroneous energization and de-energization of the pulling motor which heretofore has been a source of serious trouble in grain stirring systems.

Other features and advantages of the instant invention will be obvious from the attached drawing in which identical reference numerals will refer to like parts in the various views.

The drawing

Detailed description

Figure 1:
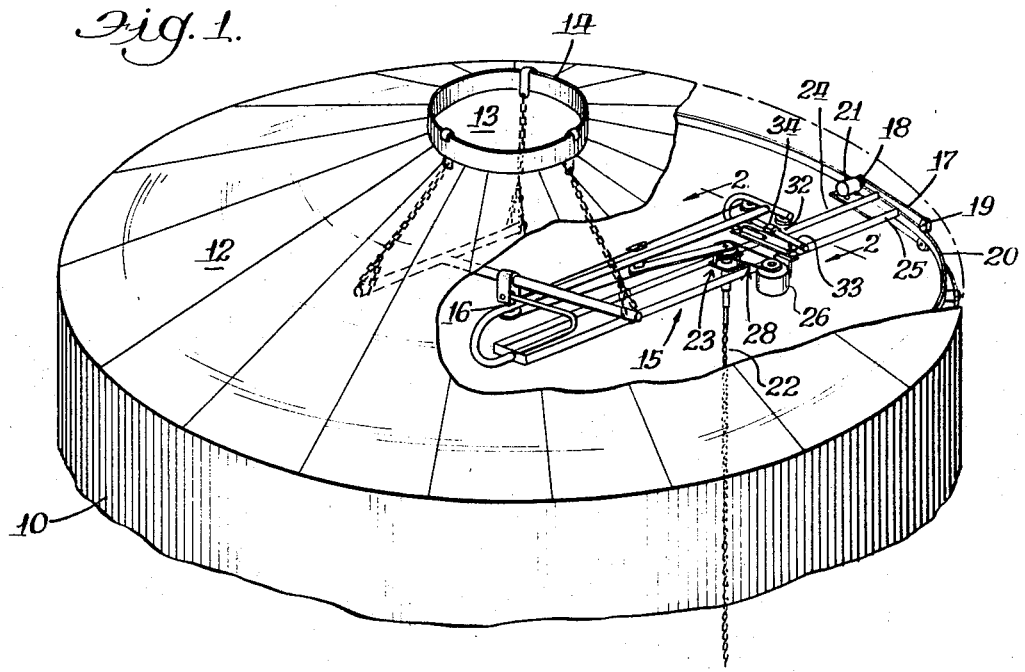
FIG. 1 illustrates one known type of stirring mechanism with which the present invention is particularly suited for use.

Referring then to FIG. 1, there is seen a conventional grain storage bin having a cylindrical side wall 10, and a conical top 12 which defines a central aperture 13. A roof hatch collar 14 is attached to the top 12 about the central aperture 13.

An elongated bridge, generally designated 15 in FIG. 1, is suspended within the storage bin, and it extends radially from its center.

The bridge 15, as is conventionally known, is adapted for angular motion about the storage bin. It pivots about a center point 16 which lies along the axis of the cylindrical side wall 10; and its outermost end is provided with a carriage 17 including front and back wheels 18 and 19 which are fitted on a circular peripheral track 20.

The bridge 15 is pulled about the storage bin in angular movement by means of a motor 21 which drives the wheel 18 of the bridge 17. The wheel 18 is provided with teeth which engage the peripheral track 20; and, when viewed from the top, the bridge 15 moves counterclockwise about the storage bin.

While the bridge 15 moves angularly about the storage bin, an auger 22 moves radially of the bin along the bridge 15. To this end, the auger 22 is suspended from a trolley generally designated 23 which is fitted on a pair of straight tracks 24 and 25.

An auger drive motor 26 is mounted on the bridge 15 and suspended over the side of the bridge to follow it as it sweeps about the bin. The auger drive motor 26, of course, rotates the auger 22; and it is attached to the trolley 23 so that it moves radially of the storage bin with the auger trolley while driving the auger 22.

As previously mentioned, while the carriage drive motor or auger pulling motor 21 pulls the carriage 17 about the storage bin, the trolley 23 traverses the tracks 24 and 25 and the auger drive motor 26 rotates the auger 22 so that the orbit of the auger 22 is a generally spiral motion of first increasing and then decreasing radius as it turns over the contents of the bin for drying.

When the load on the auger 22 is particularly heavy, as when it is stirring relatively moist grain, the auger 22 will tilt transverse of the direction of elongation of the bridge 15 with its lowermost, or free end, being dragged behind. This action tilts the trolley 23 which carries the drive motor 26. Heretofore, this tilting action had been sensed by a mercury switch to de-energize the carriage drive motor 21. The rotating action of the auger 22 together with the weight of its drive motor 26 (which is cantilevered off the side of the bridge) then forces the auger back to its proper vertical disposition, at which time, the carriage drive motor 21 is again energized. For further details of a particular mechanism which drives the auger and defines its orbit, reference may be made to the above-identified patent.

In practice, it has been found that the pulling motor 21 has repeatedly failed due to over-heating despite the fact that it is not overloaded when operated continuously. I have found that the reason for this is that the various switching mechanisms for the carriage drive motor 21 are too sensitive to the bumps and jolts which the carriage 17 encounters as it moves about the metal peripheral track 20. Ordinarily, a certain amount of tilt or drag of the auger 22 is acceptable before de-energizing the carriage drive motor 21. Previous level-sensing mechanisms have been too sensitive to variations in the drag of the auger; and in addition, they have de-energized the carriage drive motor in response to a shock transmitted through the bridge 15 when in fact the auger 22 had not exceeded its predetermined tilt limit. As a result, the pulling motor 21 was needlessly turned on and off; and in cases where it had come to rest before being turned on, the full line voltage would appear across its terminals with resultant high current thereby heating it excessively.

The improved switching mechanism of the instant invention, generally designated 28 in FIG. 1, is mounted to the auger trolley 23. As seen in more detail in FIG. 2, the instant switching mechanism includes a mounting bracket 29 which takes the form of an angle iron. The bracket 29 is mounted to the trolley 23 by means of bolts 30; and it is spaced therefrom by means of spacers 31. The direction of elongation of the bracket 29 defines a tangent to the orbit of the auger 22; that is, it lies generally perpendicular to the auger and in its direction of travel.

An L-shaped member 32 is mounted centrally of the bracket 29, and together they define a U-shaped channel for receiving an elongated tubular member 33.

The tube 33 is fitted with a central collar 34 which is pivotally mounted within the channel defined by the member 32 and the bracket 29. This is accomplished by means of the pins 35 and 36 which are threaded into the collar 34 and extend respectively through the L-shaped member 32 and the bracket 29.

On the outside of the L-shaped member 32 there is mounted a snap switch 37 having first and second terminals 38 and 39 for receiving one of the wires feeding the carriage drive motor 21. The snap switch 37 is normally closed; and its contacts are opened (thereby breaking electrical continuity between the terminals 38 and 39) when its actuating plunger 40 is depressed.

Figure 2:
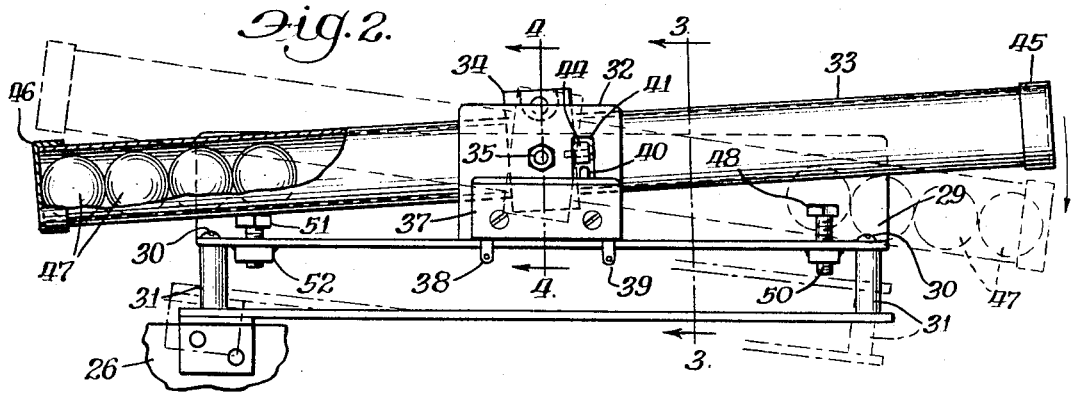
FIG. 2 is a partially cut away side elevation view of a preferred switching mechanism according to the present invention.
Figure 3:
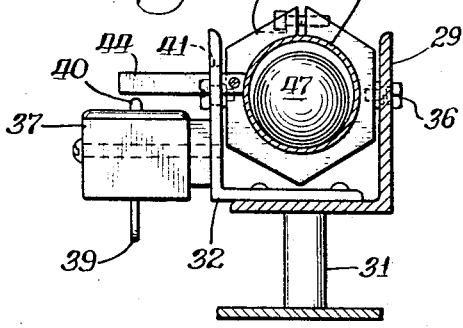
FIG. 3 is a section view taken through the sight line 3—3 in FIG. 2.
Figure 4:
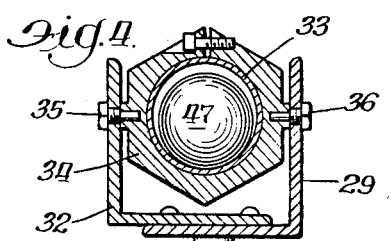
FIG. 4 is a section view taken through the sight line 4—4 in FIG. 2.

Mounted to the collar 34 and extending through an aperture 41 in the vertical side of the L-shaped member 32, is an extension arm 44. As seen in FIGS. 2 and 3, the extension arm 44 extends above the actuating plunger 40 of the snap switch 37 so that when the tube 33 is rotated clockwise relative to the bracket 29, the arm 44 will depress the plunger 40 to open the switch 37.

The tube 33 is closed at its ends by means of caps 45 and 46. Internally of the tube 33, as shown in FIG. 2, there are four freely-moveable ball bearings 47. As viewed in FIG. 2, the forward end of the switching mechanism is at the right. At the forward end of the bracket 29 beneath the tube 33 is a first stopper bolt 48 which is threadably received in the bottom of the bracket 29 and locked to it by means of a nut 50. A second stopper bolt 51 is threadably received in the bottom of the bracket 29 rearward of its center and beneath the tube 33. The stopper bolt 51 is also locked to the bracket 29 by means of a nut 52.

*Operation*

As seen in FIG. 2, when the auger 22 assumes its normal vertical orientation, the bracket 29 will lie in a horizontal plane. The ball bearings 47 are at the rear portion of the tube 33, and they provide a weight to hold the tube in that position and prevent opening of the switch 37. That is, in this position, the extension arm 41 does not engage the plunger 40 of the snap switch 37. Moreover, it is noted that the stopper 48 is extended to a position above the lower part of the bracket 29 such that as long as the bracket 29 is horizontal, the tube 22 has only one stable state, namely, when the balls are rearward of its center. In other words, as long as the bracket 29 lies in a horizontal plane indicating that the auger 22 has not exceeded its predetermined drag, the top of the stopper bolt 48 is at a vertical location sufficient to cause a slight downward tilt of the rear position of the tube 33 thereby causing the ball bearings 47 to stay at its rear. In this position, it is noted that the rear stopper bolt 51 provides support for the tube 33.

When the auger exceeds its drag limit, the bracket 29 by virtue of its mounting on the trolley 23 will be tilted out of the horizontal into the position shown by the dashed line in FIG. 2. In this position, it is noted that the forward stopper bolt 48 is lowered thereby allowing the tube 33 to rotate clockwise; but this will not occur until the rear stopper bolt 51 pushes the tube 33 slightly beyond a horizontal position. When this occurs, the ball bearings 47 will roll forward; and when they have crossed the center of the tube 33 (that is, the point at which the tube 33 pivots about the pins 35 and 36), the forward end of the tube 33 will tilt downward relative to the bracket 29, and the balls 47 will move to the forward end of the tube 33 and hold it down. In this case, the extension arm 44 will actuate the plunger 40 of the snap switch 37 and break the circuit supplying energy to the carriage drive motor 21; and the angular motion of the bridge 15 will stop until the auger rights itself. When the bracket 29 again approaches its horizontal position, the forward stopper bolt 48 will rotate the forward end of the tube 33 counterclockwise (as seen in FIG. 2) until it again has assumed a vertical position; and the ball bearings 47 will then move to the rear of the tube 33, and the extension arm 44 will disengage the plunger 40 of the switch 37. The carriage drive motor 21 will again be energized. A length of twelve inches for the tube 33 has been found satisfactory. The resultant delay between sensing an excessive drag and de-energizing the auger pulling motor is of the order of one-half to one second.

In line with the previously-described shortcomings of prior level-sensing devices used in grain stirrers of the type described, it is particularly important to note that the plunger 40 of the snap switch 37 is not actuated immediately when the bracket 29 is tilted out of its normal horizontal position. That is, first the bracket 29 is tilted, causing an instability, and then the ball bearings 47 move beyond the axis of rotation of the tube 33 before the contacts of the snap switch 37 are broken. Thus, the bridge 15 could experience a sudden shock such that the bracket 29 were rotated clockwise signalling a false exceeding of the drag limit without ever de-energizing the carriage drive motor 21 as long as the bracket 29 assumed its normal horizontal position before the ball bearings 47 passed the axis of rotation of the tube 33. This inherent time delay is also part of the operation of my improved switching mechanism in the situation in which the carriage drive motor 21 has been deactivated. That is, when the system is in a condition wherein the drag limit has been exceeded, a sudden jolt alone will not cause the drive motor 21 to be energized.

In addition to the above advantages of my system, it will be noted that the stopper bolts 48 and 51 allow for independent setting of the response characteristics of the switching mechanism.

If the stopper bolt 51 is lowered, the auger 22 will experience a greater drag before de-energizing the drive motor 21. On the other hand, the system may be made more sensitive to drag by raising of the bolt 51.

Independently of the setting of the stopper bolt 51, the stopper bolt 48 may be set to determine when the carriage drive motor will again be energized to move the bridge 15 in angular movement. If the bolt 48 is lowered, the free end of the auger 22 will move to a more forward position before the carriage drive motor 21 is energized.

Other mechanical structures can be easily conceived for performing the same operation and functions as those which I have described. Further, electrical circuit analogies can easily be drawn for obviating the difficulty which I have found in improving the overall reliability of grain stirrers. It is, therefore, intended that all such modifications and substitutions be covered as they are embraced within the spirit and scope of the appended claims.

What is claimed is:

1. In a grain stirrer including a rotating vertical auger orbiting about a storage bin containing grain, the improvement comprising: means associated with said auger for sensing a predetermined drag of said auger along its orbit; delay means responsive to said sensing means for transmitting a signal a predetermined time after said predetermined drag is sensed; and means receiving said delayed signal for stopping said orbital motion of said auger, whereby said auger seeks a vertical disposition.

2. The structure of claim 1 wherein said sensing means includes elongated means mounted for pivotal motion in a vertical plane tangential to said orbit; means for biasing said elongated means in a first stable position when said auger is vertical; and means for rotating said tubular means to a second stable position only when said auger exceeds a predetermined drag.

3. The structure of claim 2 wherein said elongated means is a tube and said delay means comprises spherical means freely moveable longitudinally of said tube, the inertia of said spherical means causing a delay between the sensing of said tilting of said auger and the rotation of said tubular means to said second stable position; and switch means actuated by rotation of said tube to said second stable position.

4. An improved switching mechanism for use with a grain stirrer including a bridge adapted for angular motion within a storage bin, an auger suspended from bridge within said bin and movable along said bridge radially of said bin, and means including a motor for pulling said bridge in angular movement about said bin, comprising: means coupled to said auger for sensing a predetermined tilt thereof in the direction of travel of said auger; and delay switching means in circuit with said motor for delaying the interruption of energy supplied to said motor for a predetermined time after said sensing means has signaled a predetermined tilt of said auger.

5. The structure of claim 4 further comprising means for independently setting the responsiveness of said interrupting means to said sensing means.

6. The structure of claim 4 further comprising means responsive to the correction of said tilt for generating a delayed signal for energizing said motor.

7. The structure of claim 4 wherein said sensing means comprises a bracket mounted above said auger and transverse to its axis; an elongated tube pivotally mounted on said bracket for motion in a vertical plane along the orbit of said auger; said tube defining an extension arm for vertical movement with said tube; a switch mounted on said bracket for movement therewith, said switch including a plunger arm beneath said extension arm of said tube; and at least one ball in said tube for holding in one of two stable positions, said inertia means causing a delay between the tilting of said bracket and the rotation of said tube with respect to said bracket.

References Cited

UNITED STATES PATENTS 3,251,582   5/1966   Murphy _____ 259—111

ROBERT W. JENKINS, *Primary Examiner.*